`United States Patent Office`

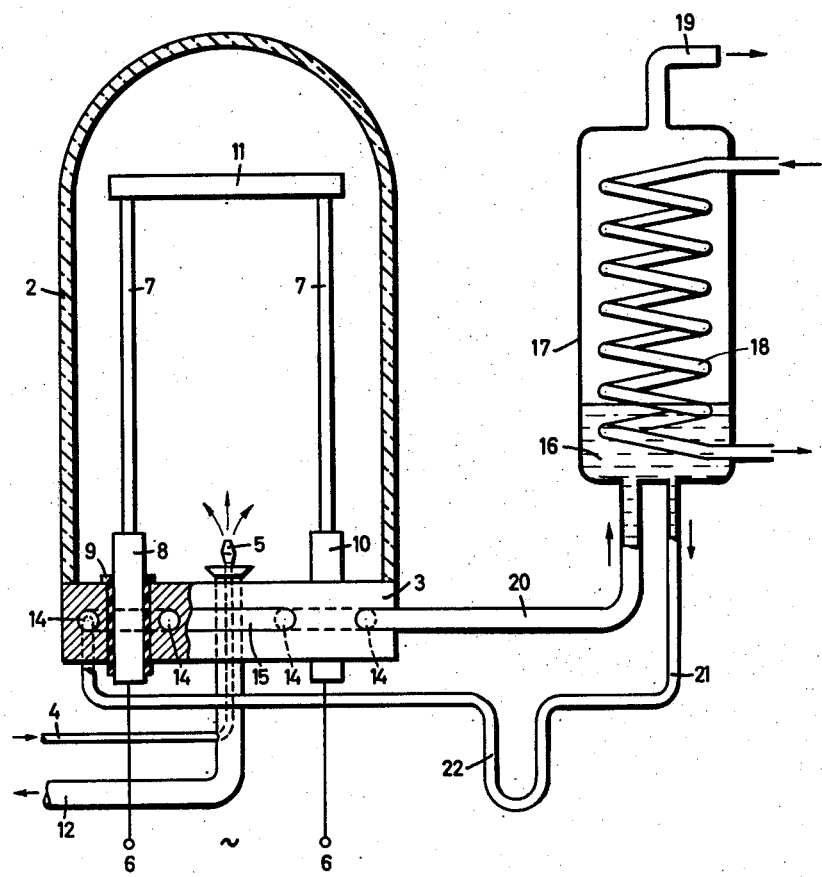

3,142,584
Patented July 28, 1964

3,142,584
METHOD FOR PYROLYTIC PRODUCTION OF HYPERPURE SEMICONDUCTOR MATERIAL
Konrad Reuschel, Pretzfeld, and Norbert Schink, Erlangen, Germany, assignors to Siemens-Schuckertwerke Aktiengesellschaft, Berlin-Siemensstadt and Erlangen, Germany, a corporation of Germany
Filed Feb. 17, 1961, Ser. No. 90,102
Claims priority, application Germany Feb. 23, 1960
3 Claims. (Cl. 117—106)

Our invention relates to the pyrolytic production of hyperpure semiconductor material, particularly silicon, for use in rectifiers, transistors, and other electronic semiconductor devices.

In such production, the hyperpure semiconductor material is obtained by chemical reaction from a gaseous compound of the material mixed with a carrier gas to act as reduction agent. The reaction is effected in a closed reaction vessel under the heat produced by a solid carrier body which consists of the same semiconductor material as the one to be produced and is heated by passing electric current through the carrier body. It has become known to use for this method a reaction vessel which comprises a base or closure structure of metal on which a bell or other envelope is supported and upon which the above-mentioned carrier body is mounted. The electric current for heating the carrier body is supplied from the outside through metallic or other electrically conducting terminal pieces to which the carrier body is attached and of which at least one is insulated from the metallic base structure.

The above-described pyrolytic precipitation of hyperpure semiconductor substance, for example silicon, is preferably effected by passing a gaseous halogen compound, preferably silicochloroform ($SiHCl_3$) together with the carrier and reaction gas, for example hydrogen, into the vessel. As a rule, the bell portion of the vessel, vacuum-tightly placed upon the above-mentioned base structure, consists, at least partially, of transparent material such as glass or quartz.

When during the precipitation process the rod-shaped carrier bodies are heated directly by passing electric current therethrough, and thus assume the pyrolysis temperature, usually above 900 and up to 1400° C., for example 1150° C. for the production of hyperpure silicon, the temperature of the closure structure with the rod holders of heat-resistant and good heat-conducting metal is preferably kept below a limit temperature of about 800° C., and this limit temperature is not exceeded during the entire pyrolytic process, in order to prevent silicon from precipitating upon the metallic surfaces of the closure structure or holders. For this purpose, the base or closure structure and the adjacent metal parts to which the carrier rods are attached have heretofore been cooled by passing water through the interior of the closure structure, the water being at a temperature not appreciably different from normal room temperature (20° C.).

When performing this method, the temperature gradient at or in the closure structure that forms the base of the processing vessel is extremely great, namely from approximately 1100° C. near the surface of the carrier rods down to approximately 20° C. at the closure structure and, as the case may be, also at the holders for the carrier rods. This extreme temperature gradient has been found to be the cause for the precipitation of higher-linkage members of the silicon compounds. Such high-molecular silicon compounds precipitate onto the closure body and the rod holders in form of a viscous, oily deposition. The oils hydrolyze readily and form hydrochloric acid as soon as they come into contact with atmospheric humidity when the bell portion of the processing vessel is being opened for exchanging the rods. Such oily precipitation also involves the danger of spontaneous ignition. Due to its large surface, the oily precipitation readily catches and binds impurities as long as the bell is open and thus may lead to contamination of the reaction space.

For that reason, each opening of the reaction vessel, upon completion of the pyrolytic production of silicon, requires thorough cleaning of the base structure as well as of the electrode or holder portions of the equipment. The oily precipitate may also cause clogging of the outlet pipe through which the gaseous residue escapes during the precipitation process. In addition, the very intensive cooling of the metal surfaces in the reaction space constitutes an appreciable loss of energy and thus contributes to the processing cost.

It is an object of our invention to eliminate the above-mentioned shortcomings due to occurrence of appreciable quantities of high-molecular oily silicon compounds on the metal surfaces within the reaction space.

To this end, and in accordance with our invention, we maintain the temperature of the metallic closure structure during the precipitation process at a temperature between 100° C. and 750° C. According to a more specific feature of our invention, we maintain the closure structure on a temperature within this range by circulating through the interior of the structure a coolant whose boiling point is in accordance with the desired cooling temperature and which is passed through the closure structure at the circulating speed required to obtain boiling within the closure structure.

According to another feature of our invention, the coolant circulation system comprises a heat-exchanging condsener at the outside of the processing equipment proper so that the coolant, evaporating within the closure structure, is liquefied in the condenser before being recirculated in liquid constitution into the closure structure.

Particularly suitable as coolant for the purposes of the invention are the substance decahydronaphthalene available in the trade under the name Dekalin ($C_{10}H_{18}$) having a boiling point of approximately 190° C., and paraffin oil having a boiling point of approximately 400° C.

The invention will be further described with reference to the apparatus for performing the above-described method according to the invention, illustrated on the accompanying drawing by way of example.

The apparatus comprises a reaction vessel consisting of a quartz bell 2 which is closed at the top and is vacuum-tightly placed upon a metallic base structure 3 serving as a closure member. The reaction vessel is supplied with the reaction gas mixture, consisting for example of a mixture of silicochloroform and hydrogen. The gas mixture enters through a gas inlet pipe 4 terminating in a nozzle 5 that produces a turbulent flow of the issuing gas. Mounted within the reaction vessel are two carrier rods 7 of hyperpure silicon which, during precipitating operation, are heated by passing current lengthwise through each rod from an alternating current source to which the electric terminals 6 of the apparatus are attached. The carrier rods 7 are vertically mounted on metallic holders 8 and 10 and have sufficient thickness to be self-supporting, for example a diameter of 5 mm. at a length of 20 cm. The upper ends of the two silicon rods are electrically connected with each other by a bridge 11 consisting of graphite or silicon. The rod holders 8 and 10 extend through the base structure 3 to the outside of the reaction vessel. The holder 8 is insulated from the base structure 3 by means of an insulating sleeve 9 of heat-resistant material such as polytetrafluoroethylene commercially available under the trademark Teflon. The thickness of the insulating sleeve 9 is such that a sufficient dissipation of heat from the rod holder 3 to the metal of the base structure 3 is secured. The spent gaseous residues leave the reaction vessen through an outlet pipe 12. The directions of gas supply and gas discharge are indicated by arrows.

The base structure 3 has a number of bores 14 extending parallel to its planar surface. The bores are interconnected on the outside of the base by pipes 15 which are soldered to the base structure. In the illustrated embodiment, four such bores 14 are provided and are serially interconnected to form part of a coolant circulation system. Any number of such cooling bores 14 can be used. The coolant flows in the closed circulation system through the bores 14 and through a riser pipe 20, a cooling heat-exchanger or condenser 17 and back through a downcomer pipe 21 to the closure structure 3.

In the interior of the base structure 3 the coolant is heated to the boiling point. The resulting mixture of vapor and liquid rises in pipe 20 up to the heat-exchanger 17 where it is cooled and condensed by means of a pipe coil 18 traversed by cooling water. The water enters at the top of coil 18 and drains from the bottom, the water-flow direction being indicated by arrows. The location of the cooling coil 18 relative to the container of the condenser 17 is preferably such that at least one turn of coil 18 is covered by liquid coolant 16. The cooler 17 is provided at its top with an outlet conduit 19 for connection to venting equipment. The circulating speed of the coolant can be adjusted by varying or selecting the cross section of riser pipe 20 relative to the downcomer pipe 21. For example by giving the riser 20 a larger cross section than the downcomer 21, the flow velocity can be increased accordingly. In addition, a siphon 22 may be provided, as shown, for properly adjusting the speed of coolant flow. The flowing speed is preferably so adjusted that the coolant will boil within the interior of the closure structure 3 but that the evolving vapor is not superheated so that the medium passing through the riser pipe 20 into the condenser consists of a mixture of vapor and liquid.

The closed coolant circulation as described above has the advantage that the temperature of the base or closure structure 3 is kept constant independently of any change in the supply of electric heating energy as will occur with increasing diameter of the rod 7 due to continuous precipitation of silicon thereupon. That is, the base structure 3 can always be kept at constant temperature corresponding to the boiling point of the coolant being used. With increasing supply of heating power and hence correspondingly increased dissipation of heat from the carrier rods to the closure structure, the increased vapor content of the liquid coolant passing through the condenser is compensated by increased condensation in the cooling condenser 17. Consequently, the illustrated and above-described equipment performs an automatic regulation of the circulating speed of the coolant in dependence upon the electric heating power supplied to the carrier rod.

Due to the fact that the temperature of the metal surface which the base structure 3 offers to the interior of the reaction vessel is kept strictly below the temperature required for pyrolytic precipitation of silicon from the gaseous compound but is nevertheless kept considerably higher than the temperature heretofore applied with the aid of cooling water, the formation and precipitation of the above-mentioned, highly detrimental oily silicon compounds is greatly minimized or virtually eliminated. As a result, the danger of contamination and of ignition is likewise eliminated and the need for frequent, thorough cleaning is very greatly reduced.

It will be obvious to those skilled in the art, upon studying this disclosure, that our invention permits of various modifications with respect to details of the apparatus being used and also affords the selection of a coolant whose boiling point best corresponds to the desired performance.

We claim:

1. The method of producing hyperpure semiconductor material for electronic purposes by pyrolytically precipitating said material, from a gaseous compound thereof mixed with a reducing gas, onto a carrier body of the same material within a closed reaction vessel having a metallic closure supporting said body, which comprises continuously passing electric current through the carrier body to maintain it at a pyrolytic temperature above 900° C., and simultaneously circulating from the outside a coolant with a boiling point of 100 to 750° C. through the interior of said closure at the circulating speed required to cause boiling of said coolant inside said closure to keep said closure substantially at said temperature, and condensing the circulating coolant outside said closure and vessel.

2. The method of producing hyperpure semiconductor material for electronic purposes by pyrolytically precipitating said material, from a gaseous compound thereof mixed with a reducing gas, onto a carrier body of the same material within a closed reaction vessel having a metallic closure supporting said body, which comprises continuously passing electric current through the carrier body to maintain it at a pyrolytic temperature above 900° C., and simultaneously circulating from the outside a coolant consisting of decahydronaphthalene, having a boiling point of about 190° C. through the interior of said closure at the circulating speed required to cause boiling of said coolant inside said closure to keep said closure substantially at said temperature, and condensing the circulating coolant outside said closure and vessel.

3. The method of producing hyperpure semiconductor material for electronic purposes by pyrolytically precipitating said material, from a gaseous compound thereof mixed with a reducing gas, onto a carrier body of the same material within a closed reaction vessel having a metallic closure supporting said body, which comprises continuously passing electric current through the carrier body to maintain it at a pyrolytic temperature above 900° C., and simultaneously circulating from the outside a coolant consisting of paraffin oil having a boiling point of about 400° C. through the interior of said closure at the circulating speed required to cause boiling of said coolant inside said closure to keep said closure substantially at said tempearture, and condensing the circulating coolant outside said closure and vessel.

References Cited in the file of this patent

UNITED STATES PATENTS

| | | |
|---|---|---|
| 2,120,559 | Jennings | June 14, 1938 |
| 2,909,411 | Krchma | Oct. 20, 1959 |
| 2,912,311 | Mason et al. | Nov. 10, 1959 |
| 2,943,918 | Pauls | July 5, 1960 |
| 2,946,668 | Richelsen | July 26, 1960 |
| 2,999,735 | Reuschel | Sept. 12, 1961 |
| 3,011,877 | Schweickert et al. | Dec. 5, 1961 |
| 3,030,189 | Schweickert et al. | Apr. 17, 1962 |